US012283390B2

(12) United States Patent
Akada et al.

(10) Patent No.: US 12,283,390 B2
(45) Date of Patent: Apr. 22, 2025

(54) COPPER-COATED STEEL WIRE, STRANDED WIRE, INSULATED ELECTRIC WIRE, AND CABLE

(71) Applicant: Sumitomo Electric Industries, Ltd., Osaka (JP)

(72) Inventors: Takumi Akada, Osaka shi (JP); Daigo Sato, Osaka shi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 510 days.

(21) Appl. No.: 17/612,538

(22) PCT Filed: Jul. 2, 2019

(86) PCT No.: PCT/JP2019/026315
§ 371 (c)(1),
(2) Date: Nov. 18, 2021

(87) PCT Pub. No.: WO2021/001928
PCT Pub. Date: Jan. 7, 2021

(65) Prior Publication Data

US 2022/0328210 A1 Oct. 13, 2022

(51) Int. Cl.
*H01B 7/22* (2006.01)
*C22C 38/00* (2006.01)
(Continued)

(52) U.S. Cl.
CPC ............. *H01B 1/02* (2013.01); *C22C 38/001* (2013.01); *C22C 38/02* (2013.01); *C22C 38/04* (2013.01); *C22C 38/40* (2013.01); *H01B 7/22* (2013.01)

(58) Field of Classification Search
CPC ... H01B 1/02; H01B 1/04; H01B 1/06; H01B 7/009; H01B 7/18; C23C 18/18;
(Continued)

(56) References Cited

U.S. PATENT DOCUMENTS

2009/0283296 A1* 11/2009 Shimosawa ........ H01B 11/1826 174/107
2011/0011639 A1* 1/2011 Visser ................ H01B 11/1008 174/105 R
(Continued)

FOREIGN PATENT DOCUMENTS

CN 103035326 A 4/2013
JP 62-18771 A 1/1987
(Continued)

OTHER PUBLICATIONS

Office Action issued in U.S. Appl. No. 16/965,420 dated Apr. 28, 2022.

*Primary Examiner* — William H. Mayo, III
(74) *Attorney, Agent, or Firm* — McCarter & English, LLP; Michael A. Sartori

(57) ABSTRACT

A copper-coated steel wire includes a core wire made of a steel and a coating layer that covers the outer peripheral surface of the core wire and is made of copper or a copper alloy. In a cross section perpendicular to the longitudinal direction of the core wire, the ten-point average roughness Rzjis of the outer peripheral surface of the core wire is 50% or more and 250% or less of the thickness of the coating layer.

16 Claims, 9 Drawing Sheets

(51) Int. Cl.

| | |
|---|---|
| ***C22C 38/02*** | (2006.01) |
| ***C22C 38/04*** | (2006.01) |
| ***C22C 38/40*** | (2006.01) |
| ***H01B 1/02*** | (2006.01) |

(58) Field of Classification Search

CPC ......... C23C 18/38; C23C 18/42; C23C 18/31; C23C 22/50; F16F 1/021; F16F 1/045

USPC .................. 174/36, 102 R, 106 R, 108, 109, 174/110 R–110 PM, 113 R, 120 R

See application file for complete search history.

(56) References Cited

U.S. PATENT DOCUMENTS

| | | | | |
|---|---|---|---|---|
| 2016/0340786 | A1* | 11/2016 | Mukai | B32B 15/013 |
| 2019/0154096 | A1* | 5/2019 | Izumida | F16F 1/024 |

FOREIGN PATENT DOCUMENTS

| | | | | | |
|---|---|---|---|---|---|
| JP | 1-289021 | A | | 11/1989 | |
| JP | 6-81099 | A | | 3/1994 | |
| JP | 2002-270039 | A | | 9/2002 | |
| JP | 2013-081982 | A | * | 5/2013 | B21C 1/00 |
| WO | 2015/041132 | A1 | | 3/2015 | |
| WO | 2017/212770 | A1 | | 12/2017 | |

* cited by examiner

COPPER-COATED STEEL WIRE, STRANDED WIRE, INSULATED ELECTRIC WIRE, AND CABLE

TECHNICAL FIELD

The present disclosure relates to a copper-coated steel wire, a stranded wire, an insulated electric wire, and a cable.

BACKGROUND ART

A copper-coated steel wire that includes a steel material the surface of which is covered with copper has been used in some cases as a member required to have both certain electrical conductivity and a certain strength (e.g., see PTLs 1 and 2).

CITATION LIST

Patent Literature

PTL 1: Japanese Unexamined Patent Application Publication No. 2002-270039
PTL 2: Japanese Unexamined Patent Application Publication No. H1-289021

SUMMARY OF INVENTION

A copper-coated steel wire according to the present disclosure includes a core wire made of a steel; and a coating layer that covers an outer peripheral surface of the core wire, the coating layer being made of copper or a copper alloy. In a cross section perpendicular to a longitudinal direction of the core wire, a ten-point average roughness Rzjis of the outer peripheral surface of the core wire is 50% or more and 250% or less of a thickness of the coating layer.

DESCRIPTION OF EMBODIMENTS

Figure 1:
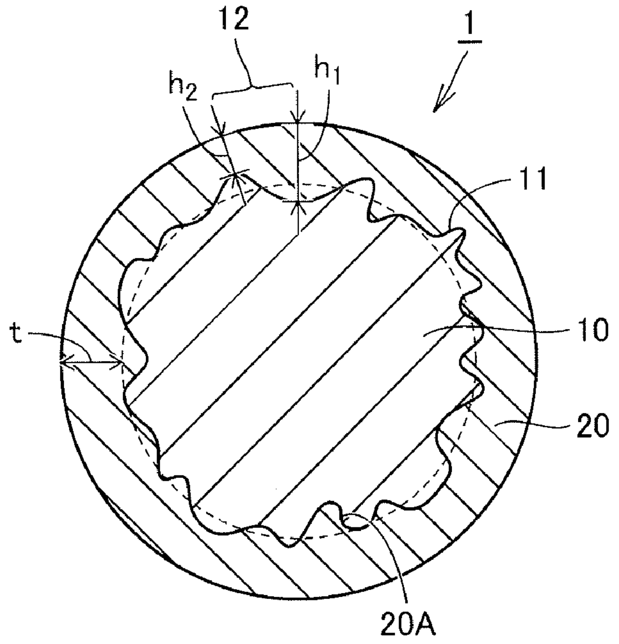
FIG. 1 is a schematic cross-sectional view of a copper-coated steel wire according to Embodiment 1, illustrating the structure of the copper-coated steel wire.

Problems to be Solved by Present Disclosure

The copper-coated steel wire includes a core wire and a coating layer made of copper or a copper alloy. The copper-coated steel wire may be used in an application where it is twisted into a predetermined shape. When the copper-coated steel wire is twisted, cracking may occur at the interface between the coating layer and the core wire. This degrades electrical conductivity and causes rupture of the steel wire. Accordingly, it is an object to provide a copper-coated steel wire that reduces the occurrence of cracking at the interface between the coating layer and the core wire.

Advantageous Effects of Present Disclosure

The copper-coated steel wire according to the present disclosure reduces the occurrence of cracking at the interface between the coating layer and the core wire.

Description of Embodiments of Present Disclosure

Aspects of the present disclosure are listed below. The copper-coated steel wire according to the present disclosure includes a core wire made of a steel and a coating layer that covers the outer peripheral surface of the core wire and is made of copper or a copper alloy. In a cross section perpendicular to the longitudinal direction of the core wire, the ten-point average roughness Rzjis of the outer peripheral surface of the core wire is 50% or more and 250% or less of the thickness of the coating layer.

In the copper-coated steel wire according to the present disclosure, the core wire made of a steel enables a high strength to be achieved. Furthermore, the coating layer made of copper or a copper alloy enables excellent electrical conductivity to be achieved. In addition, in a cross section perpendicular to the longitudinal direction of the core wire, the ten-point average roughness Rzjis of the outer peripheral surface of the core wire is set to be 50% or more and 250% or less of the thickness of the coating layer. Forming irregularities in the surface of the core wire in the above-described manner increases the bonding strength between the core wire and the coating layer. This reduces the occurrence of cracking at the interface between the coating layer and the core wire. Setting the Rzjis value to be 50% or more increases the bonding strength between the core wire and the coating layer with certainty. However, if the Rzjis value exceeds 250%, the electrical conductivity of the coating layer may become degraded. Accordingly, the Rzjis value is preferably 250% or less of the thickness of the coating layer. As described above, the copper-coated steel wire according to the present disclosure reduces the occurrence of cracking at the interface between the coating layer and the core wire.

In the above-described copper-coated steel wire, in a cross section perpendicular to the longitudinal direction of the core wire, the arithmetic average roughness Ra of the outer peripheral surface of the core wire may be 25% or more and 70% or less of the thickness of the coating layer. Setting the Ra value to be 25% or more of the thickness of the coating layer increases the bonding strength between the core wire and the coating layer with further certainty. Setting the Ra value to be 70% or less of the thickness of the coating layer enables the strength of the core wire to be maintained at a sufficient level.

In the above-described copper-coated steel wire, the steel constituting the core wire may be a ferritic stainless steel. The use of a ferritic stainless steel reduces the corrosion of the core wire.

In the above-described copper-coated steel wire, the steel constituting the core wire may be an austenitic stainless steel. The use of an austenitic stainless steel reduces the corrosion of the core wire.

In the above-described copper-coated steel wire, the composition of the austenitic stainless steel may satisfy Formula (1) below. An austenitic stainless steel having a composition satisfying Formula (1) below is suitable as a material constituting the core wire.

$$-400 \geq 1032-1667\times(A+B)-27.8\times C-33\times D-61\times E-41.7\times F \quad \text{[Math. 1]}$$

(where A represents the content [mass %] of carbon, B represents the content [mass %] of nitrogen, C represents the content [mass %] of silicon, D represents the content [mass %] of manganese, E represents the content [mass %] of nickel, and F represents the content [mass %] of chromium)

In the above-described copper-coated steel wire, the steel constituting the core wire may have a pearlite microstructure. A steel having a pearlite microstructure is suitable as a material constituting the core wire.

In the above-described copper-coated steel wire, the steel constituting the core wire may include 0.5% by mass or more and 1.0% by mass or less of carbon; 0.1% by mass or more and 2.5% by mass or less of silicon; and 0.3% by mass or more and 0.9% by mass or less of manganese, with the balance being iron and inevitable impurities.

In the above-described copper-coated steel wire, the steel constituting the core wire may further include one or more elements selected from the group consisting of 0.1% by mass or more and 0.4% by mass or less of nickel; 0.1% by mass or more and 1.8% by mass or less of chromium; 0.1% by mass or more and 0.4% by mass or less of molybdenum; and 0.05% by mass or more and 0.3% by mass or less of vanadium.

The reasons for which the composition of the steel constituting the core wire preferably falls within the above range are described below.

Carbon: 0.5% by Mass or More and 1.0% by Mass or Less

Carbon is an element that greatly affects the strength of a steel. The carbon content is preferably 0.5% by mass or more in order to achieve a sufficient strength adequate for a core wire of the copper-coated steel wire. However, if the carbon content is excessively high, toughness may become degraded, which degrades workability. Thus, the carbon content is preferably 1.0% by mass or less in order to achieve sufficient toughness. The carbon content is more preferably 0.6% by mass or more and is further preferably 0.8% by mass or more in order to further increase strength. The carbon content is more preferably 0.95% by mass or less in order to enhance toughness and workability.

Silicon: 0.1% by Mass or More and 2.5% by Mass or Less

Silicon is an element used as an deoxidizing agent in the refinement of a steel. The silicon content is preferably 0.1% by mass or more and is more preferably 0.12% by mass or more in order to allow silicon to serve as a deoxidizing agent. Silicon also serves as a carbide forming element in a steel and has softening resistance, which is a property of suppressing softening caused by heating. The silicon content is preferably 0.8% by mass or more and may be 1.8% by mass or more in order to suppress softening caused by heating during the production and service of the copper-coated steel wire. However, the addition of an excessive amount of silicon degrades toughness. The silicon content is preferably 2.5% by mass or less, is more preferably 2.3% by mass or less, and is further preferably 2.2% by mass or less in order to achieve sufficient toughness. When great importance is placed on toughness, the silicon content may be 1.0% by mass or less.

Manganese: 0.3% by Mass or More and 0.9% by Mass or Less

Similarly to silicon, manganese is an element used as an deoxidizing agent in the refinement of a steel. The manganese content is preferably 0.3% by mass or more in order to allow manganese to serve as a deoxidizing agent. However, the addition of an excessive amount of manganese degrades toughness. In addition, workability in hot working becomes degraded. Accordingly, the manganese content is preferably 0.9% by mass or less.

Inevitable Impurities

Phosphorus and sulfur may inevitably enter the steel constituting the core wire in the production of the core wire. If the amounts of phosphorus and sulfur present in the steel are excessively high, they may segregate at grain boundaries and form inclusions to degrade the properties of the steel. Accordingly, the contents of phosphorus and sulfur are each preferably 0.025% by mass or less. The total content of the inevitable impurities is preferably 0.3% by mass or less.

Nickel: 0.1% by Mass or More and 0.4% by Mass or Less

The addition of nickel reduces the likelihood of the core wire breaking when the core wire is drawn. The nickel content may be 0.1% by mass or more in order to achieve the above function with certainty. However, if the nickel content exceeds 0.4% by mass, the above-described advantageous effects of nickel become saturated. Moreover, if the content of nickel, which is an expensive element, exceeds 0.4% by mass, the costs of production of the core wire are increased. Accordingly, the nickel content is preferably 0.4% by mass or less.

Chromium: 0.1% by Mass or More and 1.8% by Mass or Less

Chromium serves as a carbide forming element in a steel and reduces the size of microstructures by forming fine carbides. Furthermore, chromium suppresses softening caused by heating. In order to achieve the above-described advantageous effects with certainty, the chromium content may be 0.1% by mass or more, 0.2% by mass or more, or 0.5% by mass or more. However, the addition of an excessive amount of chromium may degrade toughness. Accordingly, the chromium content is preferably 1.8% by mass or less. The advantageous effects of addition of chromium are particularly significant when chromium is used in combination with silicon and vanadium. Therefore, chromium is preferably used in combination with the above elements.

Molybdenum: 0.1% by Mass or More and 0.4% by Mass or Less

The addition of molybdenum increases the strength of a steel. In order to achieve the above function with certainty, the molybdenum content may be 0.1% by mass or more. However, if the molybdenum content exceeds 0.4% by mass, the above-described advantageous effects of molybdenum become saturated. Moreover, if the content of molybdenum, which is an expensive element, exceeds 0.4% by mass, the costs of production of the core wire are increased. Accordingly, the molybdenum content is preferably 0.4% by mass or less.

Vanadium: 0.05% by Mass or More and 0.3% by Mass or Less

Vanadium serves as a carbide forming element in a steel and reduces the size of microstructures by forming fine carbides. Furthermore, vanadium suppresses softening caused by heating. In order to achieve the above-described advantageous effects with certainty, the vanadium content may be 0.05% by mass or more. However, the addition of an excessive amount of vanadium degrades toughness. In order to achieve sufficient toughness, the vanadium content is preferably 0.3% by mass or less. The advantageous effects of addition of vanadium are particularly significant when vanadium is used in combination with silicon and chromium. Therefore, vanadium is preferably used in combination with the above elements.

In the above-described copper-coated steel wire, in the cross section perpendicular to the longitudinal direction of the core wire, the coating layer may include a plurality of first regions satisfying Formula (2) below, when the thickness of the coating layer reaches a local maximum and a local minimum at positions adjacent to each other in the circumferential direction of the core wire, the local maximum is defined as $h_1$, the local minimum is defined as $h_2$, the average thickness of the coating layer is defined as t, and the maximum difference between $h_1$ and $h_2$ is defined as $h_3$. When the coating layer includes the above-described first regions, the bonding force between the core wire and the coating layer is increased and, consequently, the occurrence of cracking at the interface between the coating layer and the core wire can be reduced with further certainty.

$$0.7 \leq \frac{h_3}{t} \leq 3 \quad \text{[Math. 2]}$$

The above-described copper-coated steel wire may have a diameter of 0.01 mm or more and 1 mm or less. The copper-coated steel wire according to the present disclosure is particularly suitably applied to a steel wire having a diameter falling within the above range. Note that, in the case where a cross section of the copper-coated steel wire which is perpendicular to the longitudinal direction is circular, the term "diameter" used herein refers to the diameter of the wire. In the case where the above cross section is not circular, the term "diameter" used herein refers to the diameter of one of the circles circumscribing the cross section which has the smallest area.

A stranded wire according to the present disclosure includes a plurality of the above-described copper-coated steel wires twisted together. Since the stranded wire according to the present disclosure is constituted by the copper-coated steel wires twisted together, the occurrence of cracking at the interface between the coating layer and the core wire can be reduced. Therefore, a stranded wire excellent in terms of durability can be provided.

An insulated electric wire according to the present disclosure includes the above-described copper-coated steel wire or stranded wire and an insulating layer arranged to cover the outer periphery of the copper-coated steel wire or stranded wire. Since the insulated electric wire according to the present disclosure includes the above-described copper-coated steel wire or stranded wire, the occurrence of cracking at the interface between the coating layer and the core wire can be reduced. Therefore, an insulated electric wire excellent in terms of durability can be provided.

A cable according to the present disclosure may include a wire-shaped conductor portion, an insulating layer arranged to cover the outer peripheral surface of the conductor portion, and a shield portion arranged to surround the outer peripheral surface of the insulating layer. The shield portion includes a plurality of the above-described copper-coated steel wires. Since the shield portion of the cable according to the present disclosure includes the copper-coated steel wires, the durability of the shield portion can be enhanced.

A cable according to the present disclosure includes the above-described copper-coated steel wire or stranded wire, an insulating layer arranged to cover the outer periphery of the copper-coated steel wire or stranded wire, and a shield portion arranged to surround the outer peripheral surface of the insulating layer. Since the cable according to the present disclosure includes the copper-coated steel wire or the stranded wire, the occurrence of cracking at the interface between the coating layer and the core wire can be reduced. Therefore, a cable excellent in terms of durability can be provided.

In the above-described cable, the shield portion may include a plurality of the above-described copper-coated steel wires. When the shield portion includes the copper-coated steel wires, the durability of the shield portion can be enhanced.

Details of Embodiments of Present Disclosure

A copper-coated steel wire according to an embodiment of the present disclosure is described below with reference to the attached drawings. In the drawings, the same or corresponding portions are denoted with the same reference numeral, and the description thereof is not repeated.

Embodiment 1

FIG. 1 is a cross-sectional view illustrating a cross section perpendicular to the longitudinal direction of the core wire. Referring to FIG. 1, a copper-coated steel wire 1 according to this embodiment includes a core wire 10 and a coating layer 20. The diameter of the copper-coated steel wire 1 according to this embodiment is 0.01 mm or more and 1 mm or less. In this embodiment, the steel constituting the core wire 10 has a pearlite microstructure. The coating layer 20 covers the outer peripheral surface 11 of the core wire 10. The coating layer 20 is made of copper or a copper alloy. A cross section of the copper-coated steel wire 1 which is perpendicular to the longitudinal direction is circular.

In this embodiment, the steel constituting the core wire 10 includes 0.5% by mass or more and 1.0% by mass or less of carbon, 0.1% by mass or more and 2.5% by mass or less of silicon, and 0.3% by mass or more and 0.9% by mass or less of manganese, with the balance being iron and inevitable impurities.

In the cross section perpendicular to the longitudinal direction, the ten-point average roughness Rzjis of the outer peripheral surface 11 of the core wire 10 is 50% or more and 250% or less of the thickness of the coating layer 20. The Rzjis value of the outer peripheral surface 11 of the core wire 10 is preferably 75% or more and 190% or less and is more preferably 90% or more and 160% or less. The above ten-point average roughness Rzjis may be measured by, for example, the following method. First, a sample is taken from the copper-coated steel wire 1. A cross section of the sample which is perpendicular to the longitudinal direction is polished. The interface between the core wire 10 and the coating layer 20 in the polished surface is observed in order to derive the Rzjis value of the outer peripheral surface 11 of the core wire 10. The Rzjis value can be determined by measuring the entirety of the outer peripheral surface 11 of the core wire 10 in accordance with JIS B 0601:2013. The thickness of the coating layer 20 can be determined by the following method. First, the area of the core wire 10 in the cross section perpendicular to the longitudinal direction is measured. Then, the radius (equivalent circle radius) of a circle (denoted with a broken line in FIG. 1) that corresponds to the above area is calculated. The difference between the radius of the copper-coated steel wire 1 and the equivalent circle radius of the core wire 10 is defined as the thickness t of the coating layer 20. The thickness t of the coating layer 20 is the average thickness of the coating layer 20.

In this embodiment, in the cross section perpendicular to the longitudinal direction, the arithmetic average roughness Ra of the outer peripheral surface 11 of the core wire 10 is 25% or more and 70% or less of the thickness t of the coating layer 20. The Ra value of the outer peripheral surface 11 of the core wire 10 is preferably 30% or more and 70% or less and is more preferably 35% or more and 55% or less. The above arithmetic average roughness Ra may be measured by, for example, the following method. First, a sample is taken from the copper-coated steel wire 1. A cross section of the sample which is perpendicular to the longitudinal direction is polished. The interface between the core wire 10 and the coating layer 20 in the polished surface is observed in order to derive the Ra value of the outer peripheral surface 11 of the core wire 10. The Ra value can be determined by measuring the entirety of the outer peripheral surface 11 of the core wire 10 in accordance with JIS B 0601:2013.

Figure 2:
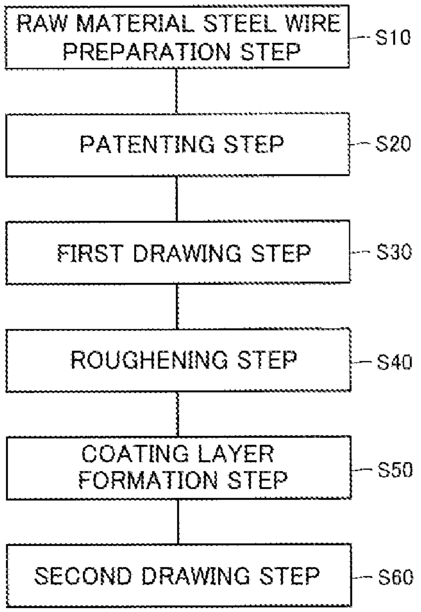
FIG. 2 is a flowchart illustrating the outline of the method for producing the copper-coated steel wire.

An example of the method for producing the copper-coated steel wire 1 is described below. Referring to FIG. 2, in the method for producing the copper-coated steel wire 1 according to this embodiment, first, a raw material steel wire preparation step is conducted as Step (S10). In Step (S10), a steel wire that is to serve as a core wire 10 is prepared. Specifically, a steel wire composed of a steel containing 0.5% by mass or more and 1.0% by mass or less of C, 0.1% by mass or more and 2.5% by mass or less of Si, and 0.3% by mass or more and 0.9% by mass or less of Mn, with the balance being Fe and inevitable impurities is prepared. The steel constituting the steel wire may further include one or more elements selected from the group consisting of 0.1% by mass or more and 0.4% by mass or less of Ni, 0.1% by mass or more and 1.8% by mass or less of Cr, 0.1% by mass or more and 0.4% by mass or less of Mo, and 0.05% by mass or more and 0.3% by mass or less of V.

Subsequently, a patenting step is conducted as Step (S20). In Step (S20), the raw material steel wire prepared in Step (S10) is subjected to patenting. Specifically, a heat treatment in which the raw material steel wire is heated to a temperature range equal to or higher than the austenitizing temperature (A1 point), subsequently rapidly cooled to a temperature range higher than the MS point, and then held within the temperature range is performed. This enables the raw material steel wire to have a fine pearlite microstructure having a small lamellar spacing. In the above patenting treatment, the treatment in which the raw material steel wire is heated to a temperature range equal to or higher than the A1 point is performed in an inert gas atmosphere in order to reduce the occurrence of decarburization.

Figure 3:
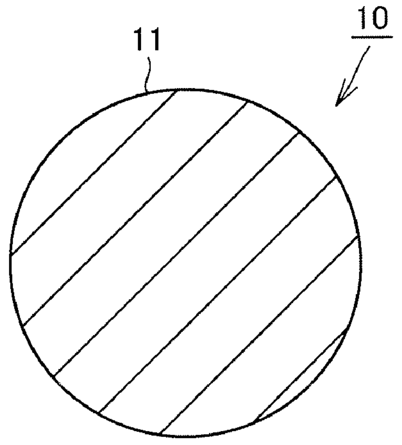
FIG. 3 is a schematic cross-sectional view used for describing the method for producing the copper-coated steel wire.

Then, a first drawing step is conducted as Step (S30). In Step (S30), the raw material steel wire that has been subjected to patenting in Step (S20) is drawn. Hereby, referring to FIG. 3, a core wire 10 having a pearlite microstructure, a cross section of the core wire 10 which is perpendicular to the longitudinal direction being circular, is produced.

Figure 4:
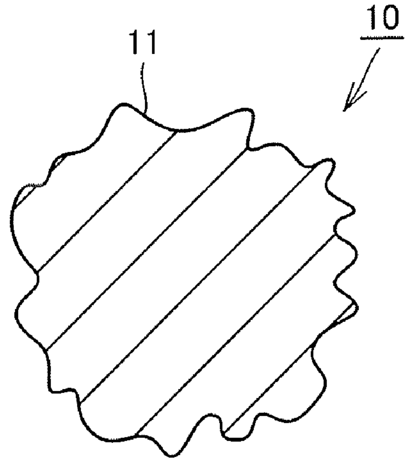
FIG. 4 is a schematic cross-sectional view used for describing the method for producing the copper-coated steel wire.

Subsequently, a roughening step is conducted as Step (S40). In Step (S40), the core wire 10 produced by performing the drawing process in Step (S30) is subjected to a roughening treatment in order to increase surface roughness. Specifically, referring to FIGS. 3 and 4, the outer peripheral surface 11 of the core wire 10 is brought into contact with an acid, such as hydrochloric acid or sulfuric acid, to increase surface roughness. A hydrochloric acid having a concentration of, for example, 35% may be used. The concentration of the sulfuric acid may be, for example, 65%. In the production of a steel wire, a pickling treatment may be performed in order to clean the surface of the steel wire and remove an oxide film present on the surface of the steel wire. The roughening treatment performed in Step (S40) is different from the common pickling treatment; in the roughening treatment, an acid with high concentration or a highly corrosive acid is used and the amount of time during which the core wire 10 is brought into contact with the acid is increased in order to achieve roughening. In this step, the surface roughness Ra may be, for example, 0.8 μm or more. As a roughening treatment, instead of or in addition to the treatment in which the core wire 10 is brought into contact with an acid, a treatment in which roughening is achieved mechanically by, for example, moving a polishing nonwoven fabric relative to the core wire 10 while pressing the polishing nonwoven fabric against the outer peripheral surface 11 of the core wire 10 may be performed.

Figure 5:
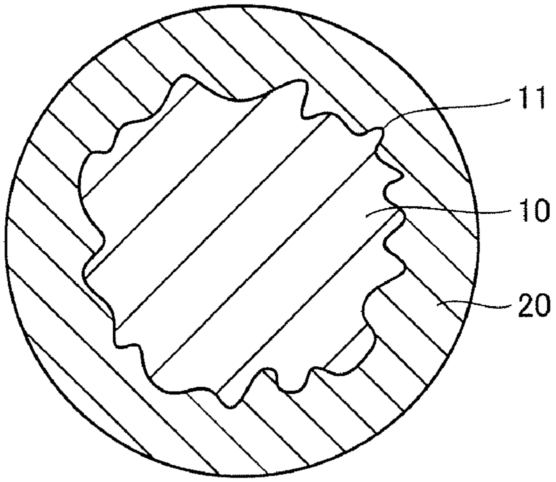
FIG. 5 is a schematic cross-sectional view used for describing the method for producing the copper-coated steel wire.

Then, a coating layer formation step is conducted as Step (S50). In Step (S50), referring to FIGS. 4 and 5, a coating layer 20 made of Cu or a Cu alloy is formed so as to cover the outer peripheral surface 11 of the core wire 10 which has been subjected to the roughening treatment in Step (S40). The thickness of the coating layer 20 formed in Step (S50) is, for example, 30 μm or more and 90 μm or less. The coating layer 20 may be formed by plating or the like. Alternatively, the coating layer 20 may be a cladding layer formed by mechanically combining, with the core wire 10, a member that is prepared separately and to serve as a coating layer 20.

Subsequently, a second drawing step is conducted as Step (S60). In Step (S60), the core wire 10 on which the coating layer 20 has been formed in Step (S50) is drawn. Hereby, a copper-coated steel wire 1 having an intended diameter is produced. The processing rate (reduction rate) and true strain in Step (S60) may be, for example, 90% or more and 2.3 or more, respectively. The production of the copper-coated steel wire 1 according to this embodiment is completed in the above-described manner.

In the copper-coated steel wire 1 according to this embodiment, in a cross section perpendicular to the longitudinal direction of the core wire 10, the ten-point average roughness Rzjis of the outer peripheral surface 11 of the core wire 10 is set to be 50% or more and 250% or less of the thickness of the coating layer 20. Forming irregularities in the outer peripheral surface 11 of the core wire 10 in the above-described manner increases the bonding strength between the core wire 10 and the coating layer 20. This reduces the occurrence of cracking at the interface 20A between the coating layer 20 and the core wire 10. Setting the Rzjis value to be 50% or more increases the bonding strength between the core wire 10 and the coating layer 20 with certainty. However, if the Rzjis value exceeds 250%, the electrical conductivity of the coating layer 20 may become degraded. Accordingly, the Rzjis value is preferably 250% or less of the thickness of the coating layer 20. As described above, the copper-coated steel wire 1 according to this embodiment reduces the occurrence of cracking at the interface 20A between the coating layer 20 and the core wire 10.

In the above embodiment, in a cross section perpendicular to the longitudinal direction of the core wire 10, the arithmetic average roughness Ra of the outer peripheral surface 11 of the core wire 10 is 25% or more and 70% or less of the thickness of the coating layer 20. Although the above Ra value is not necessarily set to fall within the above range, setting the Ra value to be 25% or more of the thickness of the coating layer 20 increases the bonding strength between the core wire 10 and the coating layer 20 with further certainty. Setting the Ra value to be 70% or less of the thickness of the coating layer 20 enables the strength of the core wire 10 to be maintained at a sufficient level.

Although a case where the steel constituting the core wire 10 has a pearlite microstructure is described in the above embodiment, the embodiment is not limited to this; the steel constituting the core wire 10 may be a ferritic or austenitic stainless steel. The use of a ferritic or austenitic stainless steel reduces the corrosion of the core wire. In the case where the steel constituting the core wire 10 is an austenitic stainless steel, the composition of the stainless steel preferably satisfies Formula (1) below.

$$-400 \geq 1032-1667\times(A+B)-27.8\times C-33\times D-61\times E-41.7\times F \quad \text{[Math. 1]}$$

(where A represents the content [mass %] of carbon, B represents the content [mass %] of nitrogen, C represents the content [mass %] of silicon, D represents the content [mass %] of manganese, E represents the content [mass %] of nickel, and F represents the content [mass %] of chromium)

In the above embodiment, the steel constituting the core wire 10 may include 0.55% by mass or more and 0.7% by mass or less of carbon, 1.35% by mass or more and 2.3% by mass or less of silicon, 0.3% by mass or more and 0.9% by mass or less of manganese, 0.2% by mass or more and 1.8% by mass or less of chromium, and 0.05% by mass or more and 0.30% by mass or less of vanadium, with the balance being iron and inevitable impurities. When the steel constituting the core wire 10 is a steel having the above composition, high durability can be achieved with further certainty.

In the above embodiment, the silicon content in the steel constituting the core wire 10 may be 1.35% by mass or more and 2.3% by mass or less. Setting the silicon content to be 1.35% by mass or more suppresses softening caused by the heat treatment performed in the processing of the copper-coated steel wire 1. Setting the silicon content to be 2.3% by mass or less limits the degradation of toughness.

In the above embodiment, the steel constituting the core wire 10 may include 0.6% by mass or more and 1.0% by mass or less of carbon, 0.12% by mass or more and 0.32% by mass or less of silicon, and 0.3% by mass or more and 0.9% by mass or less of manganese, with the balance being iron and inevitable impurities.

In the above embodiment, the steel constituting the core wire 10 may include 0.6% by mass or more and 1.0% by mass or less of carbon, 0.7% by mass or more and 1.0% by mass or less of silicon, and 0.3% by mass or more and 0.9% by mass or less of manganese, with the balance being iron and inevitable impurities.

When the steel constituting the core wire 10 is a steel having the above composition, high durability can be achieved with further certainty.

In the copper-coated steel wire 1 according to the above embodiment, the coating layer 20 may be a plating layer, and the oxygen concentration at the interface 20A between the coating layer 20 and the core wire 10 may be 10% by mass or less. In such a case, the bonding force between the core wire 10 and the coating layer 20 is increased and, consequently, the occurrence of cracking at the interface 20A between the coating layer 20 and the core wire 10 can be reduced with further certainty. The oxygen concentration at the interface 20A between the coating layer 20 and the core wire 10 is preferably 5% by mass or less and is more preferably 3% by mass or less. The oxygen concentration at the interface 20A between the coating layer 20 and the core wire 10 may be measured by, for example, conducting a quantitative analysis of a square region of a cross section of the copper-coated steel wire 1 which is perpendicular to the longitudinal direction, the square region having 300 μm sides and including the interface 20A between the coating layer 20 and the core wire 10, using EDS (energy dispersive X-ray spectrometry).

Referring to FIG. 1, in the copper-coated steel wire 1 according to the above embodiment, in a cross section perpendicular to the longitudinal direction of the core wire 10, the coating layer 20 may include a plurality of first regions 12 satisfying Formula (2) below, when the thickness of the coating layer 20 reaches a local maximum and a local minimum at positions adjacent to each other in the circumferential direction of the core wire 10, the local maximum is defined as $h_1$, the local minimum is defined as $h_2$, the average thickness of the coating layer 20 is defined as t, and the maximum difference between $h_1$ and $h_2$ is defined as $h_3$. When the coating layer 20 includes the above-described first regions 12, the bonding force between the core wire 10 and the coating layer 20 is increased and, consequently, the occurrence of cracking at the interface 20A between the coating layer 20 and the core wire 10 can be reduced with further certainty.

$$0.7 \leq \frac{h_3}{t} \leq 3 \quad \text{[Math. 2]}$$

The copper-coated steel wire 1 according to the above embodiment may have a tensile strength of 500 MPa or more and 3800 MPa or less. When the above tensile strength is 500 MPa or more, the copper-coated steel wire 1 has a sufficient strength. When the above tensile strength is 3800 MPa or less, sufficient toughness can be achieved. The above tensile strength may be measured in accordance with, for example, JIS Z 2241.

The electrical conductivity of the copper-coated steel wire 1 according to the above embodiment may be 5% IACS or more and 90% IACS or less, where "IACS" is an abbreviation of the international annealed copper standard. In such a case, sufficient electrical conductivity adequate for various applications can be achieved.

Figure 6:
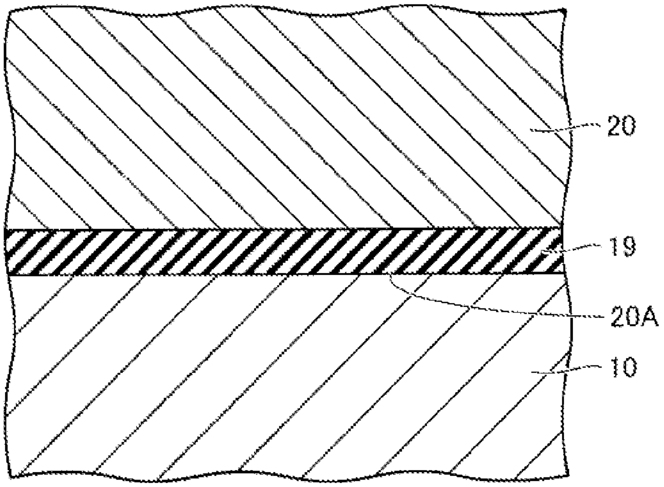
FIG. 6 is a schematic cross-sectional view illustrating a first modification example of the copper-coated steel wire according to Embodiment 1.

A first modification example of the copper-coated steel wire 1 according to Embodiment 1 is described below. FIG. 6 is a magnified view of the vicinity of the interface 20A between the coating layer 20 and the core wire 10 in a cross section perpendicular to the longitudinal direction of the core wire 10. Referring to FIG. 6, a coating layer 20 according to this modification example includes an intermediate layer 19 disposed in a region including the interface 20A between the coating layer 20 and the core wire 10. The intermediate layer 19 includes at least one of a layer composed of an alloy of the metal element included in the steel constituting the core wire 10 with copper constituting the coating layer 20 or the metal element included in the copper alloy constituting the coating layer 20 and a layer composed of an oxide including the metal element included in the steel constituting the core wire 10 and copper constituting the coating layer 20 or the metal element included in the copper alloy constituting the coating layer 20. Although the copper-coated steel wire according to the present disclosure does not necessarily include the intermediate layer 19, forming the intermediate layer 19 increases the bonding force between the core wire 10 and the coating layer 20 and consequently reduces the occurrence of cracking at the interface 20A between the coating layer 20 and the core wire 10 with further certainty.

Figure 7:
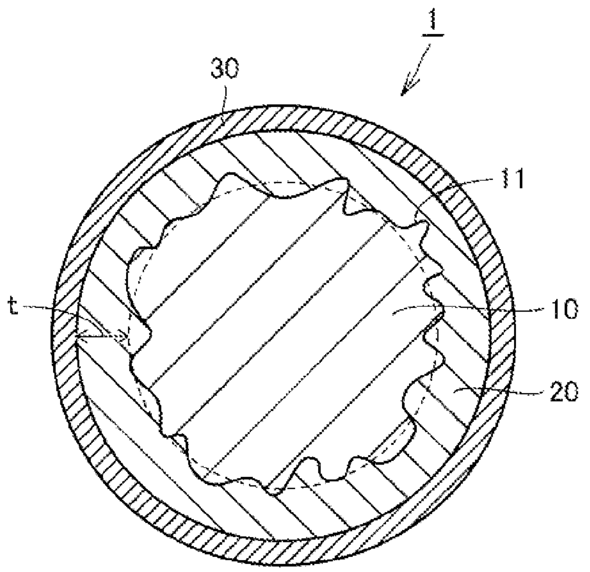
FIG. 7 is a schematic cross-sectional view illustrating a second modification example of the copper-coated steel wire according to Embodiment 1.

A second modification example of the copper-coated steel wire 1 according to Embodiment 1 is described below. FIG. 7 is a cross-sectional view illustrating a cross section perpendicular to the longitudinal direction of the core wire 10. Referring to FIG. 7, a copper-coated steel wire 1 according to this modification example includes a surface layer 30 arranged to cover the surface of the copper-coated steel wire 1. The surface layer 30 includes at least one selected from the group consisting of a gold layer, a silver layer, a tin layer, a palladium layer, a nickel layer, and a layer composed of an alloy of the above metals. Although the copper-coated steel wire according to the present disclosure does not necessarily include the surface layer 30, forming the surface layer 30 enhances the corrosion resistance, solderability, and electrical conductivity of the surface of the copper-coated steel wire 1.

Embodiment 2

Figure 8:
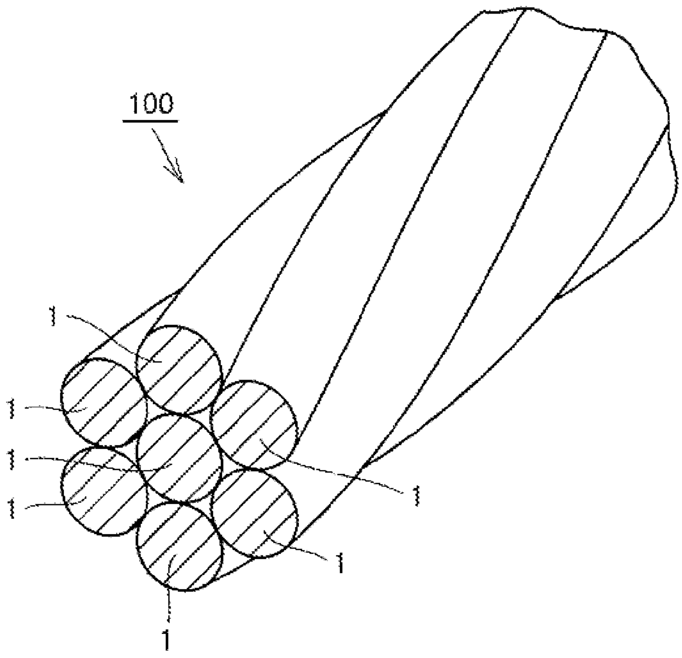
FIG. 8 is a perspective view of a stranded wire according to Embodiment 2, illustrating the structure of the stranded wire.

In Embodiment 2, a stranded wire according to an embodiment of the present disclosure is described. FIG. 8 illustrates a cross section perpendicular to the longitudinal direction of the copper-coated steel wires 1. Referring to FIG. 8, a stranded wire 100 according to this embodiment includes a plurality of the copper-coated steel wires 1 according to Embodiment 1 which are twisted together. In this embodiment, the stranded wire 100 includes seven copper-coated steel wires 1 twisted together. Each of the copper-coated steel wires 1 included in the stranded wire 100 is the copper-coated steel wire according to Embodiment 1. Since the stranded wire 100 according to this embodiment is constituted by the copper-coated steel wires 1 according to Embodiment 1 which are twisted together, the occurrence of cracking at the interface 20A between the coating layer 20 and the core wire 10 can be reduced. Therefore, a stranded wire 100 excellent in terms of durability can be provided.

Embodiment 3

Figure 9:
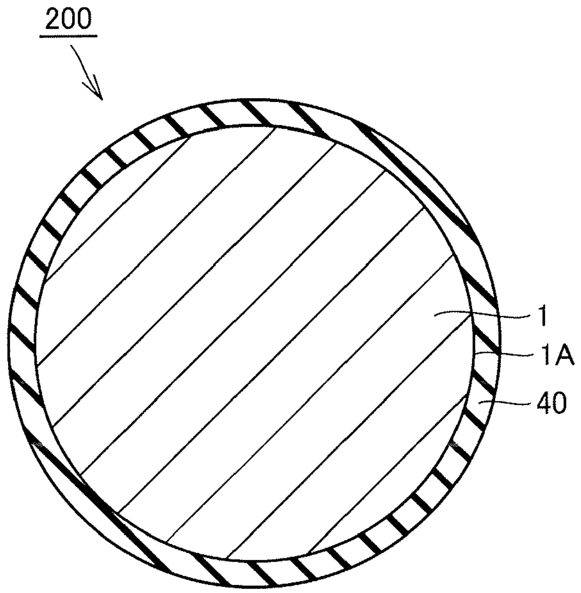
FIG. 9 is a schematic cross-sectional view of an insulated electric wire according to Embodiment 3, illustrating the structure of the insulated electric wire.

In Embodiment 3, an insulated electric wire according to an embodiment of the present disclosure is described. FIG. 9 is a cross-sectional view illustrating a cross section perpendicular to the longitudinal direction of the copper-coated steel wire 1. Referring to FIG. 9, an insulated electric wire 200 according to this embodiment includes the copper-coated steel wire 1 according to Embodiment 1 and an insulating layer 40 arranged to cover the outer periphery 1A of the copper-coated steel wire 1. Since the insulated electric wire 200 according to the present disclosure includes the copper-coated steel wire 1 according to Embodiment 1, the occurrence of cracking at the interface 20A between the coating layer 20 and the core wire 10 can be reduced. Therefore, an insulated electric wire 200 excellent in terms of durability can be provided. Although a case where the copper-coated steel wire 1 is used is described in this embodiment, this embodiment is not limited to this; the stranded wire 100 according to Embodiment 2 may be used instead of the copper-coated steel wire 1.

Embodiment 4

Figure 10:
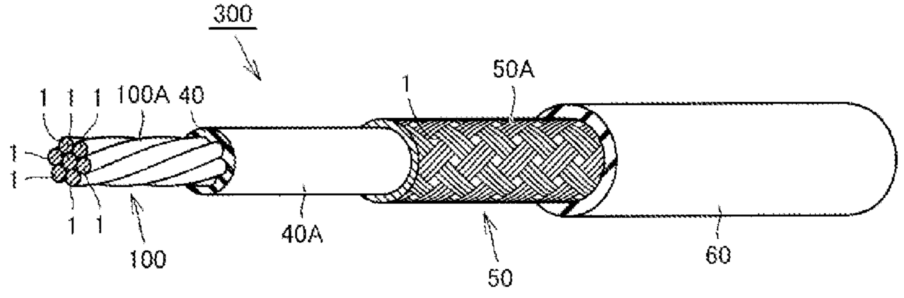
FIG. 10 is a schematic cross-sectional view of a cable according to Embodiment 4, illustrating the structure of the cable.

In Embodiment 4, a cable according to an embodiment of the present disclosure is described. FIG. 10 illustrates cross sections of a stranded wire, an insulating layer, a shield portion, and a protective layer which are perpendicular to the longitudinal direction. Referring to FIG. 10, a cable 300 includes the stranded wire 100 according to Embodiment 2, an insulating layer 40 arranged to cover the outer periphery 100A of the stranded wire 100, a shield portion 50 arranged to surround the outer peripheral surface 40A of the insulating layer 40, and a protective layer 60 arranged to cover the outer periphery 50A of the shield portion 50. The shield portion 50 includes a plurality of the copper-coated steel wires 1 according to Embodiment 1. In this embodiment, the shield portion 50 is constituted by a plurality of the copper-coated steel wires 1 according to Embodiment 1 which are knitted. Since the cable 300 according to the present disclosure includes a structure including the stranded wire 100, the occurrence of cracking at the interface 20A between the coating layer 20 and the core wire 10 can be reduced. Furthermore, since the shield portion 50 includes the copper-coated steel wires 1, the durability of the shield portion 50 can be enhanced. Therefore, a cable 300 excellent in terms of durability can be provided. Although a case where the stranded wire 100 is used as a conductor portion is described in this embodiment, this embodiment is not limited to this; the copper-coated steel wire 1 according to Embodiment 1 may be used instead of the stranded wire 100. Although a case where the shield portion 50 includes the copper-coated steel wires 1 is described in this embodiment, this embodiment is not limited to this; the shield portion 50 may be composed of a wire material other than the wire materials according to the above-described embodiments. Alternatively, the conductor portion may be composed of a wire material other than the wire materials according to the above-described embodiments and only the shield portion 50 may include the copper-coated steel wires 1 according to Embodiment 1.

EXAMPLES

A test for determining the impacts of the ratio of the ten-point average roughness Rzjis of the core wire 10 to the thickness of the coating layer 20 in the cross section perpendicular to the longitudinal direction on the properties of the copper-coated steel wire 1 was conducted. A steel including 0.82% by mass of C, 0.22% by mass of Si, and 0.45% by mass of Mn with the balance being iron and inevitable impurities was used as a steel constituting the raw material steel wire prepared in Step (S10). The results of analysis of the elements included in the steel as inevitable impurities confirmed that P: 0.011% by mass, S: 0.008% by mass, and Cu: 0.000% by mass. In Step (S50), a coating layer 20 composed of pure copper was formed by plating. A copper-coated steel wire 1 was prepared in the above-described manner. Fifty copper-coated steel wires 1 were twisted together to form a sample A. The diameter of the elemental wires measured before the sample A was prepared by twisting was 0.45 mm. The copper coverage was 30%. Note that the copper coverage is the ratio of the area of the coating layer 20 to the total area of the copper-coated steel wire 1 in a cross section of the copper-coated steel wire 1 which is perpendicular to the longitudinal direction. The Rzjis value of the outer peripheral surface 11 of the core wire 10 of the sample A was 54% of the thickness t of the coating layer 20. The Ra value of the outer peripheral surface 11 of the core wire 10 of the sample A was 19% of the thickness t of the coating layer 20.

Samples B to L which were different from the sample A in terms of at least one of the diameter of the elemental wires, the number of the elemental wires twisted together, the Rzjis value of the outer peripheral surface 11 of the core wire 10, and the Ra value of the outer peripheral surface 11 of the core wire 10 were prepared. For comparison, samples M and N that were not copper-coated steel wires but copper alloy wires were prepared. The copper alloy constituting the copper alloy wires was a copper-tin alloy.

The tensile strength of the elemental wires included in each of the samples A to N was measured before the elemental wires were twisted together. The elemental wires included in each of the samples A to F, I to K, and M were subjected to a torsion test before the elemental wires were twisted together in order to measure the yield shear stress and maximum shear stress of the sample. In the torsion test, a weight corresponding to 1% of the tensile strength of the elemental wires was attached to each sample, the twisting speed was set to 30 rpm, and the measurement interval length was set to 100 times the diameter of the elemental wires. Table 1 lists the measurement results.

Figure 11:
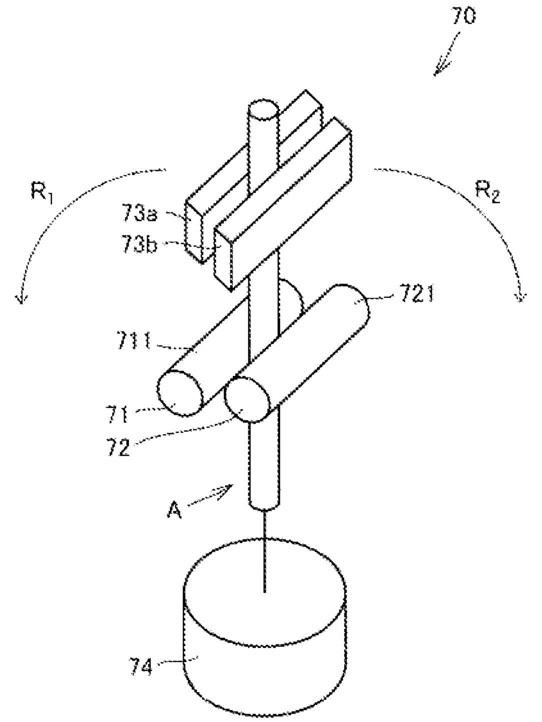
FIG. 11 is a schematic perspective view of a bending test apparatus.
Figure 12:
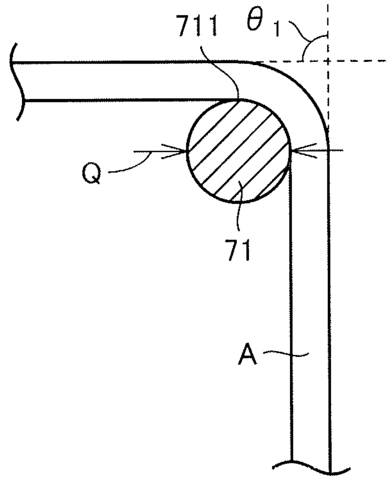
FIG. 12 is a schematic diagram used for describing the measuring method used in a bending test.
Figure 13:
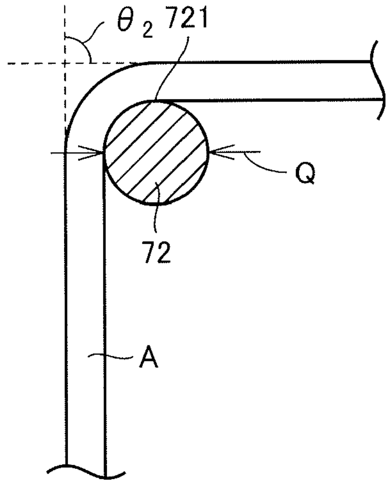
FIG. 13 is a schematic diagram used for describing the measuring method used in the bending test.
Figure 14:
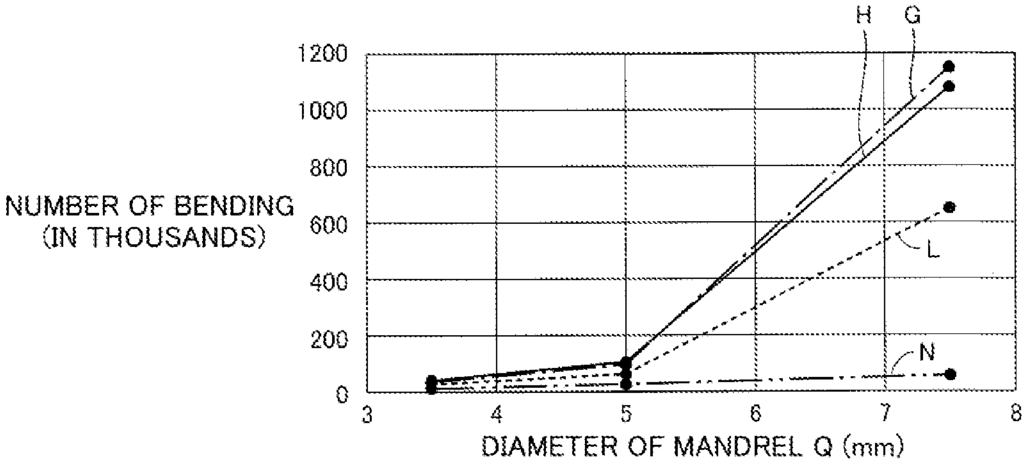
FIG. 14 is a diagram illustrating the results of the bending test.
Figure 15:
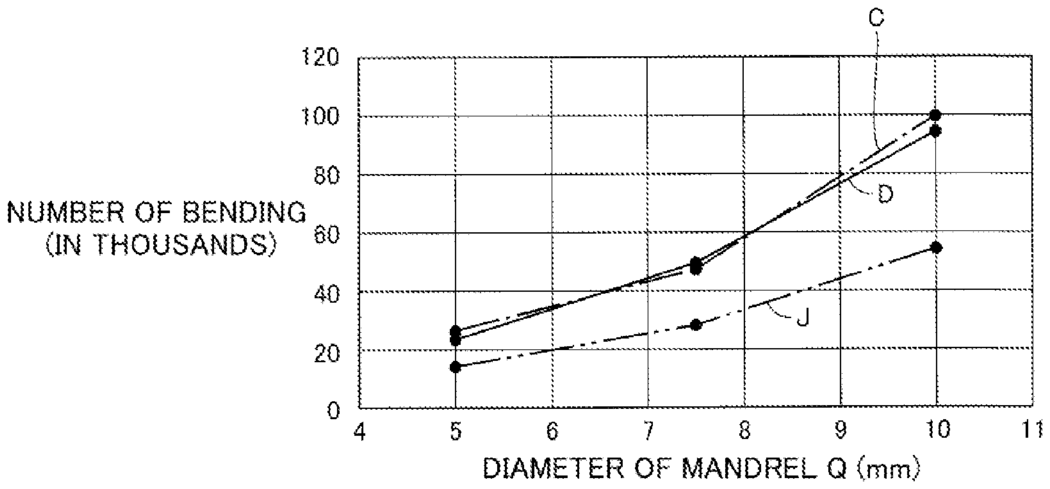
FIG. 15 is a diagram illustrating the results of the bending test.
Figure 16:
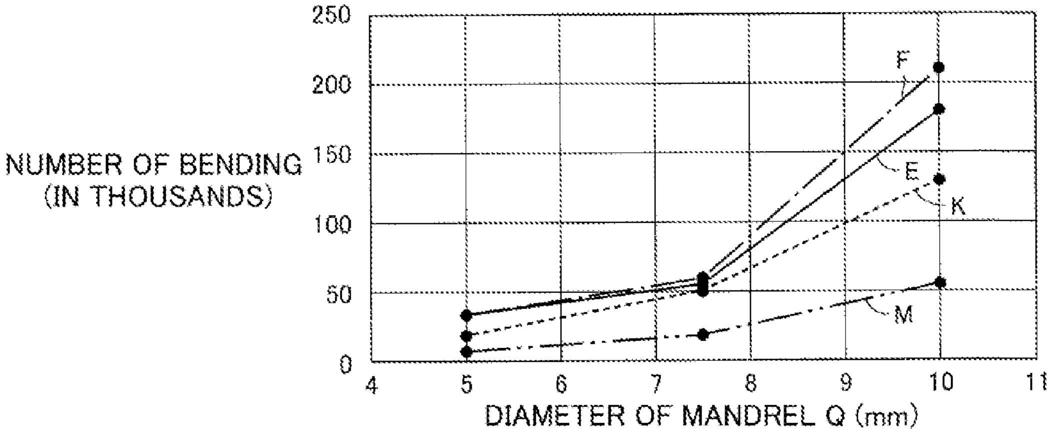
FIG. 16 is a diagram illustrating the results of the bending test.
Figure 17:
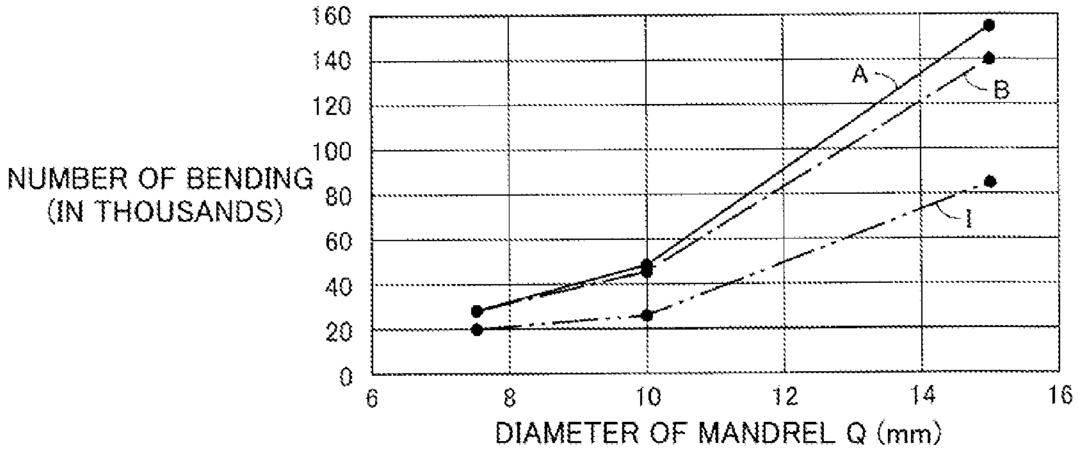
FIG. 17 is a diagram illustrating the results of the bending test.

The samples A to N were subjected to a bending test. FIGS. 12 and 13 illustrate a cross section perpendicular to the longitudinal direction of the mandrels. Referring to FIG. 11, a bending test apparatus 70 includes mandrels 71 and 72, a pair of fixtures 73*a* and 73*b*, and a weight 74. The weight 74 is attached to one of the ends of the sample A in the longitudinal direction. In this test, the load was set to 100 g. The fixtures 73*a* and 73*b* are arranged to pinch a region of the sample A which includes the other end of the sample A in the longitudinal direction. The mandrels 71 and 72 having a cylindrical shape are interposed between the weight 74 and the fixtures 73*a* and 73*b*. The sample A is arranged to come into contact with the outer peripheral surface 711 of the mandrel 71 and the outer peripheral surface 721 of the mandrel 72. The mandrels 71 and 72 are arranged perpendicular to the sample A in the longitudinal direction. The mandrels 71 and 72 have the same diameter Q (see FIGS. 12 and 13). The state illustrated in FIG. 11 is the initial state. Referring to FIGS. 11 and 12, first, the sample A is bent in the direction of the arrow $R_1$ along the outer peripheral surface 711 of the mandrel 71. The maximum bending angle $\theta_1$ of the sample A is 90°. Referring to FIGS. 11 and 13, after the sample A has returned to the position of the initial state, the sample A is bent in the direction of the arrow $R_2$ along the outer peripheral surface 721 of the mandrel 72. The maximum bending angle $\theta_2$ of the sample A is 90°. When the sample A is bent in the direction of the arrow $R_1$ and subsequently bent in the direction of the arrow $R_2$, it is considered that the sample is bent one time. The sample A was repeatedly bent in the above-described manner, and the number of bending performed until the sample had ruptured was counted. The samples B to N were subjected to the above measurement similarly to the sample A. Furthermore, the diameter Q of the mandrels 71 and 72 was changed, and the number of bending performed until the sample had ruptured was counted for each of the diameters Q of the mandrels 71 and 72. FIGS. 14 to 17 illustrate the measurement results. In FIGS. 14 to 17, the vertical axis represents the number of bending performed until the sample had ruptured and the horizontal axis represents the diameter Q of the mandrels 71 and 72. Note that the diameter Q of the mandrels 71 and 72 is in millimeters. In FIGS. 14 to 17, "Diameter of mandrel Q" refers to the diameter Q of the mandrels 71 and 72.

TABLE 1

| | Diameter of elemental wires (mm) | Number of wires twisted together (Number of stranded wires) | Copper coverage (%) | Ratio of Ra | Ratio of Rzjis | Tensile strength of elemental (%) (MPa) | Yield shear stress (%) (MPa) | Maximum shear stress wires (MPa) |
|---|---|---|---|---|---|---|---|---|
| Sample A | 0.45 | 50 | 30 | 19 | 54 | 1800 | 590 | 1120 |
| Sample B | 0.45 | 50 | 30 | 23 | 76 | 1760 | 580 | 1100 |
| Sample C | 0.32 | 7 | 30 | 25 | 95 | 2010 | 620 | 1210 |
| Sample D | 0.32 | 7 | 30 | 31 | 112 | 1995 | 600 | 1180 |
| Sample E | 0.18 | 32 | 30 | 32 | 145 | 2130 | 680 | 1240 |
| Sample F | 0.18 | 32 | 30 | 36 | 156 | 2145 | 670 | 1230 |
| Sample G | 0.05 | 77 | 30 | 63 | 203 | 2285 | — | — |
| Sample H | 0.05 | 77 | 30 | 54 | 186 | 2300 | — | — |
| Sample I | 0.45 | 50 | 30 | 5 | 18 | 1790 | 490 | 895 |
| Sample J | 0.32 | 7 | 30 | 6 | 25 | 1990 | 520 | 1030 |
| Sample K | 0.18 | 32 | 30 | 9 | 38 | 2140 | 575 | 1065 |
| Sample L | 0.05 | 77 | 30 | 12 | 43 | 2315 | | |
| Sample M | 0.18 | 32 | — | — | — | 650 | 140 | 290 |
| Sample N | 0.05 | 77 | — | — | — | 700 | — | — |

Referring to Table 1, the samples A to H, in which the ratio of Rzjis fell within a range of 50% or more and 250% or less, were clearly superior to the samples I to L, in which the ratio of Rzjis was outside the above range, in terms of tensile strength. The samples A to F, in which the ratio of Rzjis fell within the above range, were clearly superior to the samples I to K, in which the ratio of Rzjis was outside the above range, in terms of yield shear stress and maximum shear stress. Referring to FIGS. 14 to 17, the samples A to H, in which the ratio of Rzjis fell within the above range, were clearly superior to the samples I to L, in which the ratio of Rzjis was outside the above range, in terms of the number of bending performed until the sample had ruptured. This is presumably because, in the samples A to H in which the ratio of Rzjis fell within the above range, the occurrence of cracking at the interface 20A between the coating layer 20 and the core wire 10 was reduced.

Referring to Table 1 and FIGS. 14 to 17, the samples A to H, which included the copper-coated steel wire, were far superior to the samples M and N, which included a copper alloy wire, in terms of tensile strength and the number of bending performed until the sample had ruptured. Referring to Table 1, the samples A to H, which included the copper-coated steel wire, were far superior to the sample M in terms of yield shear stress and maximum shear stress. This confirmed that the samples A to H, which included the copper-coated steel wire, had a sufficient strength.

The above test results confirm that the copper-coated steel wire 1 according to the present disclosure enables a copper-coated steel wire capable of reducing the occurrence of cracking at the interface 20A between the coating layer 20 and the core wire 10 to be provided.

It should be understood that embodiments and examples disclosed herein are illustrative and not restrictive in all aspects. The scope of the present disclosure is defined by the claims, rather than the description above, and is intended to include any modifications within the scope or equivalents of the claims.

REFERENCE SIGNS LIST

1 COPPER-COATED STEEL WIRE, 1A, 50A, 100A OUTER PERIPHERY, 10 CORE WIRE, 11, 40A, 711, 721 OUTER PERIPHERAL SURFACE, 12 FIRST REGION, 19 INTERMEDIATE LAYER, 20 COATING LAYER, 20A INTERFACE, SURFACE LAYER, 40 INSULATING LAYER, 50 SHIELD PORTION, 60 PROTECTIVE LAYER, 70 BENDING TEST APPARATUS, 71, 72 MANDREL, 73*a*, 73*b* FIXTURE, 74 WEIGHT, 100 STRANDED WIRE, 200 INSULATED ELECTRIC WIRE, 300 CABLE, Q DIAMETER, $R_1$, $R_2$ DIRECTION, $h_1$ LOCAL MAXIMUM, $h_2$ LOCAL MINIMUM, t THICKNESS, A, B, C, D, E, F, G, H, I, J, K, L, M, N SAMPLE, $\theta_1$, $\theta_2$ MAXIMUM BENDING ANGLE.

The invention claimed is:

1. A copper-coated steel wire comprising:
a core wire made of a steel; and
a coating layer that covers an outer peripheral surface of the core wire, the coating layer being made of copper or a copper alloy,
wherein, in a cross section perpendicular to a longitudinal direction of the core wire, a ten-point average roughness Rzjis of the outer peripheral surface of the core wire is 50% or more and 250% or less of a thickness of the coating layer; and
wherein, in the cross section perpendicular to the longitudinal direction of the core wire, an arithmetic average roughness Ra of the outer peripheral surface of the core wire is 25% or more and 70% or less of the thickness of the coating layer.

2. The copper-coated steel wire according to claim 1, wherein the steel constituting the core wire is a ferritic stainless steel.

3. The copper-coated steel wire according to claim 1, wherein the steel constituting the core wire is an austenitic stainless steel.

4. The copper-coated steel wire according to claim 3, wherein a composition of the austenitic stainless steel satisfies Formula (1) below, $$-400 \geq 1032-1667\times(A+B)-27.8\times C-33\times D-61\times E-41.7\times F \quad \text{[Math. 1]}$$

(where A represents the content [mass %] of carbon, B represents the content [mass %] of nitrogen, C represents the content [mass %] of silicon, D represents the content [mass %] of manganese, E represents the content [mass %] of nickel, and F represents the content [mass %] of chromium).

5. The copper-coated steel wire according to claim 1, wherein the steel constituting the core wire has a pearlite microstructure.

6. The copper-coated steel wire according to claim 5, wherein the steel constituting the core wire includes 0.5% by mass or more and 1.0% by mass or less of carbon; 0.1% by mass or more and 2.5% by mass or less of silicon; and 0.3% by mass or more and 0.9% by mass or less of manganese, with the balance being iron and inevitable impurities.

7. The copper-coated steel wire according to claim 6, wherein the steel constituting the core wire further includes one or more elements selected from the group consisting of 0.1% by mass or more and 0.4% by mass or less of nickel; 0.1% by mass or more and 1.8% by mass or less of chromium; 0.1% by mass or more and 0.4% by mass or less of molybdenum; and 0.05% by mass or more and 0.3% by mass or less of vanadium.

8. The copper-coated steel wire according to claim 1, wherein, in the cross section perpendicular to the longitudinal direction of the core wire, the coating layer includes a plurality of first regions satisfying Formula (2) below, when the thickness of the coating layer reaches a local maximum and a local minimum at positions adjacent to each other in a circumferential direction of the core wire, the local maximum is defined as $h_1$, the local minimum is defined as $h_2$, the average thickness of the coating layer is defined as t, and the maximum difference between $h_1$ and $h_2$ is defined as $h_3$.

$$0.7 \leq \frac{h_3}{t} \leq 3 \quad \text{[Math. 2]}$$

9. The copper-coated steel wire according to claim 1, having a diameter of 0.01 mm or more and 1 mm or less.

10. A stranded wire comprising a plurality of the copper-coated steel wires according to claim 1, the copper-coated steel wires being twisted together.

11. An insulated electric wire comprising:
the copper-coated steel wire according to claim 1 or a stranded wire comprising a plurality of the copper-coated steel wires according to claim 1; and
an insulating layer arranged to cover an outer periphery of the copper-coated steel wire or stranded wire.

12. A cable comprising:
a wire-shaped conductor portion;
an insulating layer arranged to cover an outer peripheral surface of the conductor portion; and
a shield portion arranged to surround an outer peripheral surface of the insulating layer,
wherein the shield portion includes a plurality of the copper-coated steel wires according to claim 1.

13. A cable comprising:

the copper-coated steel wire according to claim 1 or a stranded wire comprising a plurality of the copper-coated steel wires according to claim 1;

an insulating layer arranged to cover an outer periphery of the copper-coated steel wire or stranded wire; and a shield portion arranged to surround an outer peripheral surface of the insulating layer.

14. A cable comprising:

the copper-coated steel wire according to claim 1 or a stranded wire comprising a plurality the copper-coated steel wires according to claim 1;

an insulating layer arranged to cover an outer periphery of the copper-coated steel wire or stranded wire; and a shield portion arranged to surround an outer peripheral surface of the insulating layer, wherein the shield portion includes a plurality of the copper-coated steel wires according to claim 1.

15. The copper-coated steel wire according to claim 1, wherein the thickness of the coating layer is 30 μm or more and 90 μm or less.

16. The copper-coated steel wire according to claim 1, wherein an electrical conductivity of the copper-coated steel wire is 5% international annealed copper standard (IACS) or more and 90% IACS or less.

* * * * *